UNITED STATES PATENT OFFICE.

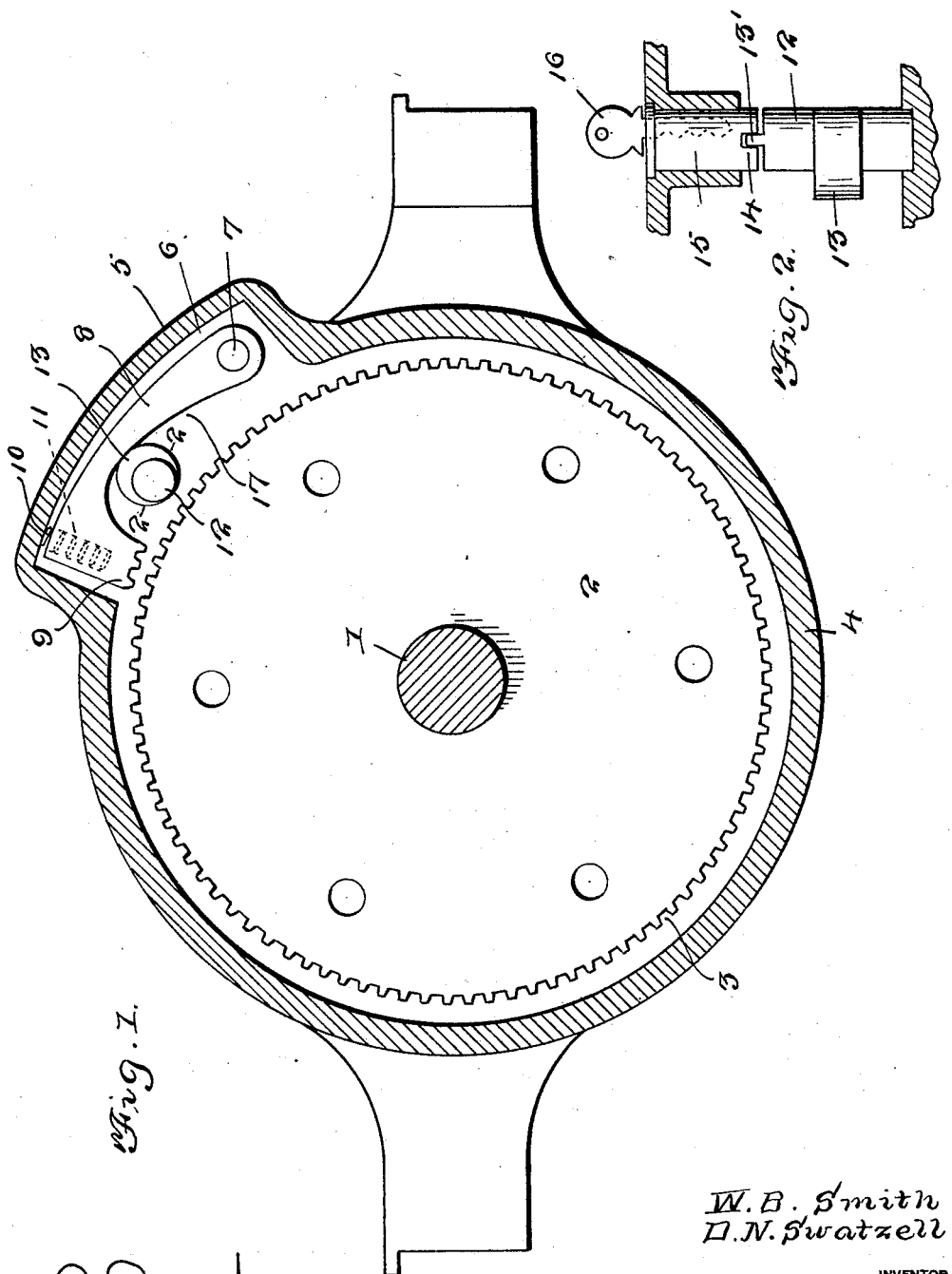

WILBURN B. SMITH AND DAVID N. SWATZELL, OF BIRMINGHAM, ALABAMA.

LOCKING DEVICE FOR MOTORS.

1,388,778.     Specification of Letters Patent.     Patented Aug. 23, 1921.

Application filed December 14, 1920. Serial No. 430,697.

*To all whom it may concern:*

Be it known that we, WILBURN B. SMITH and DAVID N. SWATZELL, citizens of the United States, residing at Birmingham, in the county of Jefferson and State of Alabama, have invented new and useful Improvements in Locking Devices for Motors, of which the following is a specification.

Our present invention has reference to a means for locking the motor of an automobile so that the same cannot be started by unauthorized persons.

In carrying out our invention, we propose to provide a locking dog for engaging with one of the rotary parts of the motor, and to also provide means for locking the dog in such engagement.

It is also our object to build out the case of the fly wheel of an automobile to provide a pocket therein, to form or secure on the periphery of the fly wheel teeth, to arrange in the pocket a pivoted spring influenced dog that has its active face toothed to engage with the teeth of the fly wheel, spring means influencing the dog to such engagement, and cam means being provided for swinging the dog out of such engagement, while locking means is provided for said cam means.

The drawings illustrate a satisfactory embodiment of the improvement reduced to practice, and in which:—

Figure 1 is an elevation, partly in section of the fly wheel case, and the fly wheel of an automobile, and the arrangement of the improvement in the case.

Fig. 2 is a sectional view approximately on the line 2—2 of Fig. 1.

While we have illustrated our improvement in connection with the fly wheel and fly wheel case of an automobile, it is to be understood that the same may be applied with equal efficiency on other rotatable parts of the motor.

Referring now to the drawings in detail, the crank shaft 1 has secured thereto the usual fly wheel 2. In the present instance, the fly wheel 2 is provided with peripheral teeth 3. The teeth 3 may be formed on a cylindrical band which is inserted over the fly wheel and secured thereto in any desired manner, but, of course, the fly wheel may be integrally formed with the said teeth, if desired.

The fly wheel case is indicated by the numeral 4, and in carrying out our improvement we form the same with an outstanding bulged portion 5 which provides, on its interior, a substantially rectangular pocket 6. In this pocket we pivot, as at 7, a dog 8. The dog has its active face arranged on the end thereof opposite the pivot and the said active face is provided with teeth 9 that are designed to engage with the teeth 3 of the fly wheel. When the teeth of the dog are thus engaged with the teeth of the fly wheel, the latter will, of course, be held against turning.

The dog is normally forced into engaging position with the fly wheel through the medium of a spring 10 that is received in a suitable socket 11 in the said dog, adjacent the head or active face thereof, the spring exerting a tension against the outer wall of the dog 6.

Journaled in suitable openings in the sides of the pocket is a rod or shaft 12 that is approximately centrally provided with a cam enlargement 13. On one end of the shaft 12 is a lug 13' that is received in a notch 14 in the barrel 15 of a permutation lock. The lock is preferably in the nature of an ordinary pin lock, and the key for operating the same is indicated by the numeral 16.

It will be apparent that when the key is turned to revolve the barrel of the lock the shaft 12 will be likewise turned, so that its cam surface 13 may be brought out of engagement with the inwardly inclined edge 17 of the dog 8, thus permitting the spring 10 to force the toothed surface of the dog into engagement with the teeth 3 of the fly wheel 2. When the lock is operated to turn the shaft 12 in an opposite direction, the cam 13 will ride on to the inner edge 17 of the dog, thus elevating the same in the pocket 6 against the pressure of the spring 10, and bringing the dog out of engagement with the fly wheel to permit of the operation of the motor.

Having thus described the invention, what we claim, is:—

In combination with the fly wheel of a motor, provided with peripheral teeth, and a fly case in which the wheel is housed, and said motor having an outwardly extended portion providing a pocket therein; of a dog pivotally secured in the pocket having a toothed end for engaging with the teeth of the fly wheel, spring means for influencing the dog to such engagement, a shaft journaled transversely in the housing below the dog, a cam surface thereon in the path of engagement with the inner edge of the dog, a lug on one end of the shaft, and a lock including a rotary barrel which has a notched end in which the lug of the shaft is received.

In testimony whereof we, affix our signatures.

WILBURN B. SMITH.
DAVID N. SWATZELL.